(12) United States Patent
Flaherty

(10) Patent No.: US 11,875,640 B2
(45) Date of Patent: *Jan. 16, 2024

(54) AGGREGATE TAX LIABILITY IN WAGERING

(71) Applicant: CFPH, LLC, New York, NY (US)

(72) Inventor: Phillip L. Flaherty, Las Vegas, NV (US)

(73) Assignee: CFPH, LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/373,836

(22) Filed: Jul. 13, 2021

(65) Prior Publication Data

US 2021/0343115 A1 Nov. 4, 2021

Related U.S. Application Data

(63) Continuation of application No. 16/406,096, filed on May 8, 2019, now Pat. No. 11,069,188, which is a continuation of application No. 14/678,705, filed on Apr. 3, 2015, now Pat. No. 10,319,184.

(51) Int. Cl.
*G07F 17/32* (2006.01)
*H04L 67/52* (2022.01)

(52) U.S. Cl.
CPC ...... *G07F 17/3244* (2013.01); *G07F 17/3237* (2013.01); *H04L 67/52* (2022.05)

(58) Field of Classification Search
CPC .... G06Q 40/123; G06Q 20/207; H04L 67/18; G07F 17/3234; G07F 17/3232; G07F 17/3244; G07F 17/3237

USPC .............................................. 463/25; 705/31
See application file for complete search history.

(56) References Cited

U.S. PATENT DOCUMENTS

| | | | | |
|---|---|---|---|---|
| 6,006,199 A * | 12/1999 | Berlin | ................ | G06Q 30/0629 705/26.81 |
| 8,210,931 B2 * | 7/2012 | Alderucci | ........... | G07F 17/3244 463/16 |
| 8,635,126 B2 * | 1/2014 | Risnoveanu | ........... | G06Q 20/10 705/7.14 |
| 8,753,194 B2 * | 6/2014 | Schneider | ............ | G06Q 40/123 463/25 |
| 8,814,645 B1 * | 8/2014 | Hanson | .................. | G06Q 50/34 463/13 |
| 9,552,692 B2 * | 1/2017 | Muir | .................... | G07F 17/3244 |
| 9,905,078 B2 * | 2/2018 | Amaitis | ............. | G07F 17/3237 |
| 11,017,639 B2 * | 5/2021 | Hanson | ............... | G07F 17/3293 |
| 2004/0110554 A1 * | 6/2004 | Bromfield | ........... | G07F 17/3288 463/17 |

(Continued)

*Primary Examiner* — Michael A Cuff

(57) ABSTRACT

Methods, apparatus and article of manufacture for computing an aggregate tax liability at a gaming device comprises receiving an indication from the gaming device of a start and end of a gaming period. A plurality of games are played by a player during the gaming period. The amount of the player's winnings and losses for each game played is monitored. A total winnings and a total losses incurred by the player during the gaming period is computed, and an aggregate amount that comprises a summation of the total winning and the total losses during the gaming period is also computed. Based on the location of the gaming device, determine a jurisdiction that governs the aggregate tax liability. Compute the aggregate tax liability based on the aggregate amount and the jurisdiction.

19 Claims, 4 Drawing Sheets

(56) References Cited

U.S. PATENT DOCUMENTS

| | | | |
|---|---|---|---|
| 2005/0153774 A1* | 7/2005 | Okada | G07F 17/32 463/25 |
| 2005/0170884 A1* | 8/2005 | Okada | G07F 17/3269 463/25 |
| 2007/0239572 A1* | 10/2007 | Harris | G06Q 40/00 705/35 |
| 2008/0009344 A1* | 1/2008 | Graham | G07F 17/3239 463/16 |
| 2008/0242392 A1* | 10/2008 | Inamura | G07F 17/3244 463/17 |
| 2012/0122555 A1* | 5/2012 | Schneider | G06Q 40/123 463/25 |
| 2012/0244946 A1* | 9/2012 | Muir | G07F 17/3237 463/42 |
| 2012/0246037 A1* | 9/2012 | Wilmes | G06Q 20/207 705/31 |
| 2013/0332168 A1* | 12/2013 | Kim | G06F 16/632 704/251 |
| 2015/0095205 A1* | 4/2015 | Hebner | G06Q 20/405 705/31 |
| 2015/0149334 A1* | 5/2015 | Tully | G06Q 40/123 705/30 |
| 2015/0187176 A1* | 7/2015 | Amaitis | G07F 17/3232 463/25 |
| 2015/0302855 A1* | 10/2015 | Kim | G10L 15/22 704/275 |
| 2016/0063643 A1* | 3/2016 | Martin | G06Q 40/123 705/31 |
| 2016/0104138 A1* | 4/2016 | Newell | H02S 50/00 705/34 |
| 2016/0180484 A1* | 6/2016 | Roebuck | G06Q 50/265 705/31 |
| 2016/0191481 A1* | 6/2016 | Zimmer | H04L 63/12 713/168 |
| 2016/0247239 A1* | 8/2016 | Houseworth | G06Q 40/123 |

* cited by examiner

AGGREGATE TAX LIABILITY IN WAGERING

CROSS-REFERENCE TO RELATED APPLICATIONS

This patent application is a continuation of U.S. patent application Ser. No. 16/406,096, filed May 8, 2019, which is a continuation application of U.S. patent application Ser. No. 14/678,705, filed Apr. 3, 2015, the disclosures of which is hereby incorporated by reference herein in its entirety.

FIELD

The subject matter disclosed herein relates to an electronic gaming systems and methods for tracking wagering gains and losses from a gaming session and submitting an aggregate tax on behalf of the player.

BACKGROUND

The gaming industry has numerous casinos located both worldwide and in the United States. A client of a casino or other gaming entity can gamble via various games of chance and games of skill. For example, craps, roulette, baccarat, blackjack, poker, and electronic or electromechanical games (e.g. a slot machine, a video poker machine, and the like) where a person may gamble on the outcome.

Players may play these games at a stationary kiosk or on wireless devices, such as a smartphone, a tablet, a wearable technology, or the like.

Under current laws governing the taxation of wagering gains and loses, a player is permitted to calculate gambling games and losses after they cash out of a single gaming session. A wagering gain means the amount won in excess of the amount wager (basis). A wagering loss means the amount of the wager (basis) is lost.

Currently, a player must keep track of receipts from every single play in a game or every wager made. She would have to calculate the gain or loss on every transaction separately and treat every play or wager as a taxable event. The player would have to trace and recompute the basis through all transactions to calculate the result for each play or wager.

A better view is that the gamble, such as the taxpayer who plays slot machines, recognizes a wagering gain or loss after the end of a gaming session, such as she redeems her tokens. An aggregate amount from the winnings and loses during the gaming period is used to compute the tax liability.

DETAILED DESCRIPTION

Figure 1:
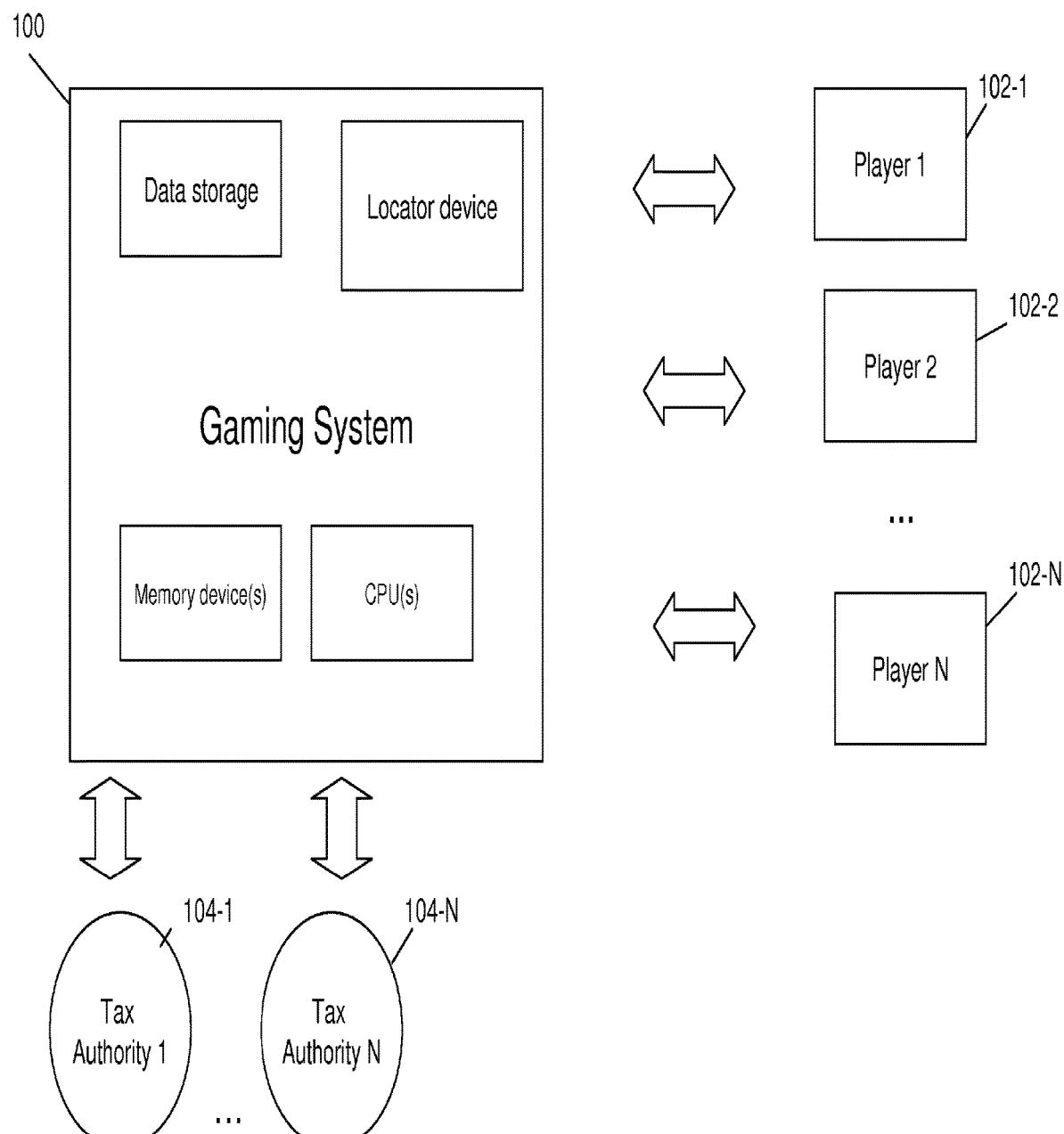
FIG. 1 illustrates gaming system 100.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Those skilled in the art will recognize that the embodiments of the present invention involve both hardware and software elements which portions are described below in such detail required to construct and operate a game method and system according to the embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), and optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied thereon, for example, in baseband or as part of a carrier wave. Such a propagated signal may take any variety of forms, including, but not limited to, electromagnetic, optical, or any suitable combination thereof. A computer readable signal medium may be any computer readable medium that is not a computer readable storage medium and that can communicate, propagate, or transport a program for use by or in conjunction with an instruction execution system, apparatus, or device.

Program code embodied on a computer readable medium may be transmitted using any appropriate medium, including but not limited to wireless, wireline, optical fiber cable, RF and the like, or any suitable combination of the foregoing.

Computer program code for carrying out operations for aspects of the present invention may be written in any combination of one or more programming languages, including an object oriented programming language such as Java, Smalltalk, C++ or the like or conventional procedural programming languages, such as the "C" programming language, AJAX, PHP, HTML, XHTML, Ruby, CSS or similar programming languages. The programming code may be configured in an application, an operating system, as part of a system firmware, or any suitable combination thereof. The programming code may execute entirely on the user's computer, partly on the user's computer, as a stand-alone software package, partly on the user's computer and partly on a remote computer or entirely on a remote computer or server as in a client/server relationship sometimes known as cloud computing. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks. As used herein, a "terminal" should be understood to be any one of a general purpose computer, as for example a personal computer or a laptop computer, a client computer configured for interaction with a server, a special purpose computer such as a server, or a smart phone, soft phone, tablet computer, personal digital assistant, wearable technology (such as VR headsets, smart watches, smart glasses, smart rings), or any other machine adapted for executing programmable instructions in accordance with the description thereof set forth above. The embodiments of the present invention may be facilitated by any one of the electronic devices described above.

FIG. 1 illustrates gaming system 100 as it communicates with one or more players 102-1 through 102-N as well as one or more tax authorities 104-1 through 104-N. Players 102-1 through 102-N may play any number of games and different types of games through gaming system 100. Depending on the location of players 102-1 through 102-N, gamin system 100 may determine the relevant tax jurisdiction for the tax liability incurred by players 102-1 through 102-N during their gaming sessions. System 100 may submit pre-authorize tax documents along with payment of the tax liability and an electronic signature on behalf of player 102-1 through 102-N to any one of tax authorities 104-1 through 104-N.

System 100 tracks the winnings and loses for a player during a gaming session and computing an aggregate tax liability for the player. The aggregate tax liability may be computed for one or more games that are played by a single player during a gaming session. The gaming session may be defined in advance either by the player, by the casino, a taxing authority in the jurisdiction, or another entity. One or more games may be played during a gaming session by the same player. The games may be from the same type or game, or from different type of games. Generally, the games in a gaming session are played from a single location, although it is possible for the gaming session to be tied to a particular device, rather than the location of the player.

Figure 2:
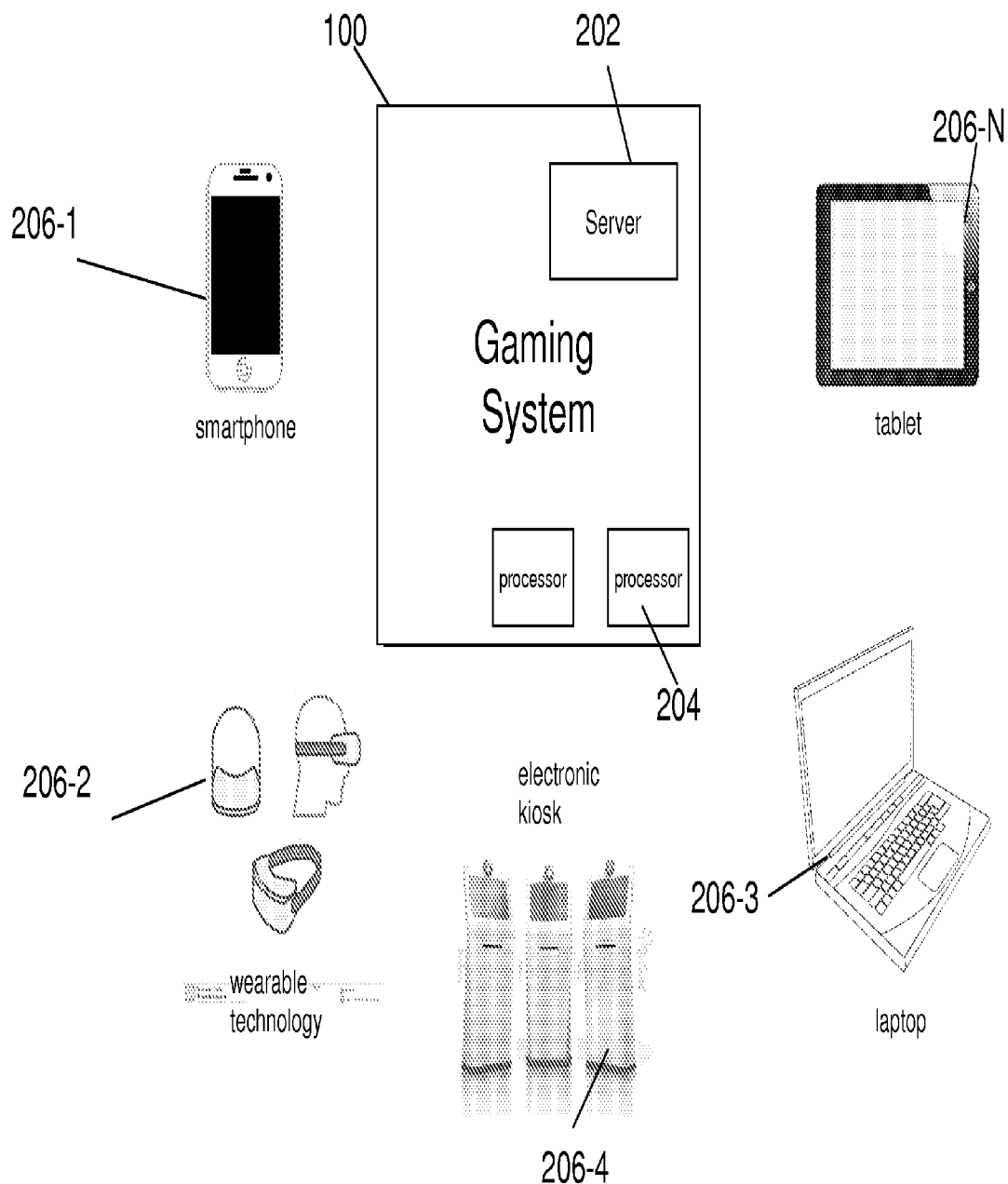
FIG. 2 illustrates system 100 interacting with various type of electronic devices 206-1 through 206-N.

FIG. 2 illustrates system 100 interacting with various type of electronic devices 206-1 through 206-N. System 100 comprises one or more servers 202, one or more processors 204 running software, and any number of electronic gaming devices 206-1 through 206-N configured to access said server 202 facilitating the playing of games on the remote devices 206-1 through 206-N.

As shown in FIG. 2, electronic gaming devices 206-1 through 206-N may comprise of any number of devices, such as a stand-alone kiosk, a mobile device, a tablet, a smart phone, a wearable electronic device (such as a smart watch, a VR headset), and the like. Electronic gaming devices 206-1 through 206-N may be owned by the casino or by the player. In one embodiment, the present invention may be in the form of a software application ("App") downloadable onto smart phones, tablets, wearable technology or computers and usable via processing power and a user interface associated therewith.

Server 102 also may be in communication with remote servers located at various taxing authorities.

Figure 3:
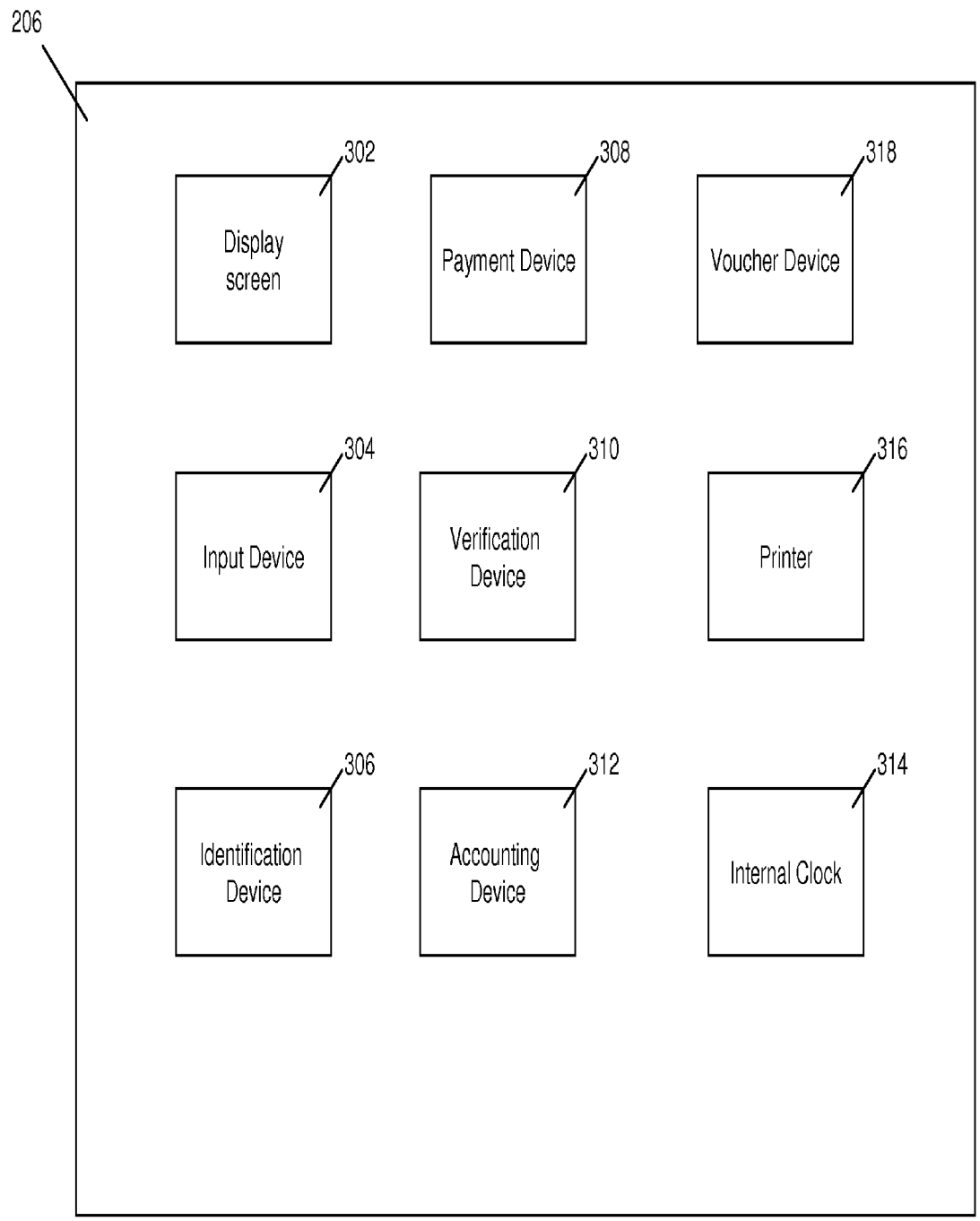
FIG. 3 illustrates some components of electronic gaming device 206.

FIG. 3 illustrates some components of electronic gaming device 206. As shown in FIG. 3, electronic gaming device 206 may include one or more display screens 302, input device 304, identification device 306, payment device 308, a verification device 310, accounting device 312, internal clock 314, printer 316 and voucher device 318.

Electronic gaming device 206 may display one or more streaming medias on display screen 302. Streaming media may be obtained from one or more gaming tables, one or more other electronic gaming devices, a central server, a video server, a music server, an advertising server, another data source, and/or any combination thereof.

Electronic gaming device 206 may include input device 304, which is capable of receiving an indication that a gaming session has started. In one embodiment, the start of the gaming session begins when the player logs into electronic gaming device 206 using input device 304. The player may log onto electronic gaming device 206 by entering a login and password. The gaming session ends when the player logs off the electronic gaming device 206, such as when the player exits his account. An indication that the gaming session has ended may be transmitted.

In one embodiment, the gamin session would be treated as beginning when the gambler places the first wager on a particular type of game and ending when the same gambler completes his last wager on the same type of game before the end of the same calendar day, i.e. beginning on or after 12:00 am and ending at 11:59 p.m. In another embodiment, the window of time for a session may be greater than a calendar day. In another embodiment, the window of time for a session is less than an entire calendar day.

In one embodiment, the player is required to use the same session of play if he stops and resumes the same game in the same establishment during the same calendar day. A player is not permitted to offset gains and losses from separate sessions. Once a player goes to another gaming establishment a new session would begin, even if on the same calendar day.

Input device 304 may be mechanical buttons, electronic buttons, mechanical switches, electronic switches, optical switches, a slot pull handle, a keyboard, a keypad, a touch screen, a gesture screen, a joystick, a pointing device (e.g., a mouse), a virtual (on-screen) keyboard, a virtual (on-screen) keypad, biometric sensor, or any combination thereof. Input device 304 may be utilized to make a wager, to select one or more reel-of-one functionalities, to obtain player's point balances, to obtain any player point data, to control any object, to select one or more pattern gaming options, to obtain data relating to historical payouts, to select a row and/or column to move, to select a row area to move, to select a column area to move, to select a symbol (or image) to move, to modify electronic gaming device 100 (e.g., change sound level, configuration, font, language, etc.), to select a movie or song, to select live streaming medias, to request services (e.g., drinks, slot attendant, manager, etc.), to select two-dimensional ("2D") game play, to select three-dimensional ("3D") game play, to select both two-dimensional and three-dimensional game play, to change the orientation of games in a three-dimensional space, to move a symbol (e.g., wild, multiplier, etc.), and/or any combination thereof. These selections may occur via any other input device (e.g., a touch screen, voice commands, etc.). Input device 304 may be any control panel.

The player also may log onto electronic gaming device 206 by submitting biometrics (e.g., thumb print, retinal scan, or other biometric) through identification device 306, which is utilized to allow electronic gaming device 100 to determine an identity of a player.

Identification device 206 may include a card entry slot into input device 304. Identification device 306 may include a keypad with an assigned pin number for verification. Identification device 306 may include multiple layers of identification for added security. In one embodiment, a player could be required to enter a player tracking card, and/or a pin number, and/or a thumb print, and/or any combination thereof.

Once the player's identity has been identified by identification device 306, a player profile may be retrieved. A player profile may contain any number of relevant information, such as the player's personal information, taxable jurisdiction, related tax submission paperwork, and the player's electronic signature.

Based on information obtained by identification device 306, electronic gaming device 206 may be reconfigured. For example, the language, sound level, music, placement of video streams, placement of images, placement of gaming options, and/or the tables utilized may be modified based on player preference data.

In another embodiment, the start of the gaming session is indicated by the player inserts a form of payment into payment device 308. Some example forms of payment may include, but not limited to, a credit card, a player's card with points, a token, cash, and the like.

Payment device 308 may be utilized to collect monies and distribute monies (e.g., cash, vouchers, etc.). Payment device 308 may interface with a remote device to electronically transmit money and/or credits. Payment device 308 may interface with a credit card and or a player's card to exchange player points. The gaming session ends when the player removes the form of payment from payment device 308, or when the monetary value is used up and there is insufficient funds for further game play.

Verification device 310 verifies payment information received from payment device 308. Verification device 310 may perform the verification internally. In another embodiment, verification device 310 transmits the payment information to a third party server that is remote to electronic device 106. The third party server verifies the payment information off-site and then transmits either an acceptance or decline of the propose payment.

Accounting device 312 tracks the wins and losses incurred by the player during the gaming session. At the end of the gaming session, accounting device 312 computes an aggregate amount earned (or lost) by the player during the entirety of the gaming session. In some embodiments, electronic gaming device 206 comprises an internal clock 314 that keeps track of the date and time. Internal clock 314 is utilized to determine when a calendar day for a gaming session has begun (i.e on or after 12:00 a.m.) and when a calendar day has ended (i.e., at 11:59 p.m.).

Accounting device 312 may retrieve information from the player's profile in order to determine whether the computed aggregate amount triggers a taxable event. Whether a taxable event has been trigger is dependent on jurisdictional law governing the player's aggregate amount. For example, account device 312 may determined that the aggregate amount falls below the taxable threshold, and therefore indicate to the player that no tax liability exists. Accounting device 312 also may remain silent on the issue of taxation, until a taxable event has been triggered.

Electronic gaming device 206 also may include printer 316 which is capable of printing a receipt with the player's tax liability. In one embodiment, the receipt may include all of the winnings and losses incurred during the gaming session, as well as the computed aggregate amount. In one embodiment, printer 118 encompasses a TITO (ticket-in-ticket-out) device.

In one embodiment, a player obtains the aggregate tax liability and any other relevant tax information using Near-Field technology. For example, if electronic gaming device 206 is a stand-alone kiosk, the player may obtain the tax information by simply downing an appropriate app onto his smartphone, and then tapping his smartphone against the kiosk.

In one embodiment, electronic gaming device 206 is the player's personal mobile device, such as a tablet or iPhone. As such, the aggregate tax liability computed can be saved directed onto the player's device.

In one embodiment, electronic gaming device 206 is able to automatically transmit the player's aggregate tax liability to a third party tax preparation entity, such as the player's accountant. In another embodiment, the aggregate tax liability that is computed by accounting device 312 may be retrieved by an online tax preparation website, such as TurboTax® and the like.

Electronic gamin device 206 also may include a voucher device 318 may generate, print, transmit, or receive a voucher. The voucher may represent a wagering option, a wagering structure, a wagering timeline, a value of wager, a payout potential, a payout, player point data, universal player point data, and/or any other wagering data. A voucher may represent an award, which may be used at other locations inside of the gaming establishment. For example, the voucher may be a coupon for the local buffet or a concert ticket.

Figure 4:
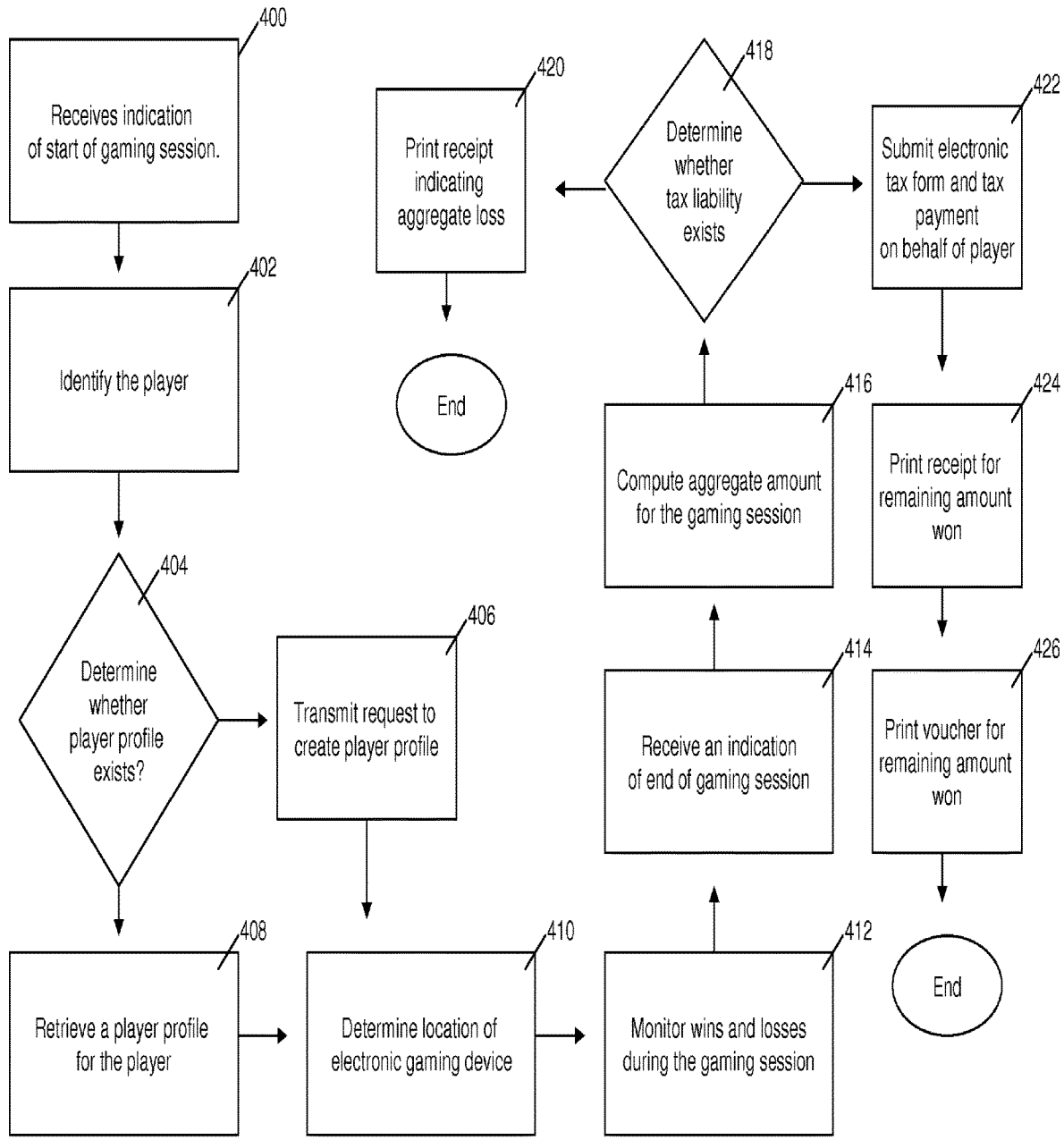
FIG. 4 illustrates a flowchart of the process of the invention.

FIG. 4 illustrates a flowchart of the process of the invention, including steps for automatically submitting a payment of the computed aggregate tax liability on behalf of the player. In some embodiments, it may be desirable for the player to not have to stop playing a game in order to sign and submit tax reporting form (paper). Some aspects of automatic tax submission on behalf of a player are described in U.S. application Ser. No. 14/584,381, filed on Dec. 29, 2014, which is incorporated by reference herein.

As shown in FIG. 4, system 100 receives 400 an indication of a start of a gaming session. The start of the gaming session may be indicated by a player logging onto electronic gaming device 206 or inserting a form of payment into payment device 308. Identification device 306 identifies 402 the player and determines 404 whether the player has a player profile on file. As described above, the player profile may contain any number of relevant information, such as the player's personal information, taxable jurisdiction, related tax submission paperwork, and the player's electronic signature. If no player profile is found (such as this is the first time the player is using system 100), system 100 may request that the player submit all relevant information for establishing a player profile, such as personal information and relevant jurisdictions for taxation purposes. System 100 also may request that the player pre-authorize tax submission documents and provide an electronic signature which will be used in the event that an tax liability is triggered at the end of the gaming session.

In one embodiment, before a player ever begins playing, the player authorizes (e.g., signs their name) to a tax reporting form (paper). In some instances, the authorization is required at several locations on the tax reporting paper. The player may signed several copies of the tax forms in advance. Each signature represents the person having signed off for each taxable event that may subsequently occur at the machine. Hence, if person hits certain jackpot, he has already signed and an attendant only needs to reset the machine. In such a scenario, the player may hit a certain number of jackpots without having to sign the form.

In one embodiment, the player using input device 304 may sign in and enter a pin or some form of electronic signature. This pin/signature may be the "same" as having written his name on the session form. In addition, he may indicate that he is providing his signature for a certain number of games. In another embodiment, the player may provide his signature for a specific length of time. For example, if the player is in Las Vegas for a weekend bachelor party, he may specify that his signature is valid for any games played that weekend. The system may have a default number to use for either the certain number of games or the specific length of time.

If a player profile is available for the player, then system 100 retrieves 408 the player profile. System 100 also may determined 410 the location of electronic gamin device 206 as it pertains to the current gaming session. The player profile is updated with this location. System 100 also may determine whether the tax submission documents and electronic signature stored in the player profile is still valid. If any of the documents or electronic signature have expired or is no longer valid, system 100 may transmit additional requests to the player to update the information in the player profile.

In one embodiment, the system requests that the player fill out an electronic tax form for each jurisdiction. The system obtains an electronic authorization from the player. The system determines, based on the player's winnings, that the player has a tax liability.

In one embodiment, the system transmits, in response to the tax liability, a tax submission to a remote device. The tax submission comprises at least the electronic tax form and the electronic authorization. In one embodiment, the system receives an indication that the electronic authorization is valid for a period of time. In one embodiment, the system receives an indication that the electronic authorization is valid for a quantity of games played by the player. In one embodiment, the system receives an indication that the electronic authorization is valid for a quantity of tax submissions. In one embodiment, the system receives an indication that the electronic authorization is valid up to a total tax liability amount, in which the total tax liability amount is determine in advance of receiving the request from the player. In one embodiment, the system receives an indication that the electronic authorization is valid for a type of game.

In one embodiment, the system generates an authorization profile for the player, in which the authorization profile comprises the electronic authorization for at least one jurisdiction. In one embodiment, the system obtains the electronic authorization of the player by receiving an electronic signature. In another embodiment, the system obtains the electronic authorization of the player by receiving biometric data of the player. In one embodiment, the system obtains the electronic authorization of the player by performing a retinal scan on the player. In one embodiment, the system obtains the electronic authorization of the player by performing a facial scan on the player. In one embodiment, the system obtains the electronic authorization of the player by performing a fingerprint scan on the player. In one embodiment, the system requests that the player fill out at least one tax form for each relevant jurisdiction. In one embodiment, the system monitors the game for an amount of the player's winnings. In one embodiment, the system determines whether the amount of the player's winnings exceeds a taxable threshold for the at least one jurisdiction. In one embodiment, the taxable threshold varies depending on the jurisdiction. In one embodiment, the taxable threshold is an amount that is determined by the location of the player.

System 100 then monitors 412 the wins and losses incurred during the gaming session via accounting device 312. Once system 100 receives 414 an indication that a gaming session has ended, such as the player logs on the session or removes a credit card from payment device 308, then an aggregate amount from the winning and losses are computed 316 via accounting device 312.

Using the information provided by the player profile and the location of the player, system 100 determines 318 whether the aggregate amount triggers a tax threshold. If no tax threshold is trigger, then no tax ability exists. System 100 may print 420 a receipt indicating the aggregate loss, which the player may use in its taxable filing for the calendar year. The game session ends without requiring further input from the player.

However, if a tax threshold is triggered, then system 100 may submit 422 a pre-authorized tax submission along with the player's electronic signature to the relevant tax authority 104-1 through 104-*n* (as shown in FIG. 1). System 100 also may deduct the amount of the tax liability from the total winnings, and then print 424 a receipt for the remaining amount.

In one embodiment, the electronic tax form and the electronic authorization are transmitted automatically without player input. In one embodiment, a notification is transmitted to the player that the tax submission has been transmitted.

In one embodiment, the system awards the player with a payout that comprises the player's winnings less the tax liability. In one embodiment, the system stores the player's winnings as credits. In one embodiment, the credits may be redeemable for playing future games. In another embodiment, the credits may be converted into cash. In one embodiment, the system prints a voucher that is redeemable at a cashier location in an amount of the player's winnings.

In one embodiment, the system receives a request to modify the electronic authorization from the player. In one embodiment, the request to modify further includes canceling the electronic authorization for the game. In another embodiment, the request to modify includes adjusting the period of time in which the electronic authorization is valid. In another embodiment, the request to modify includes adjusting the quantity of games in which the electronic authorization is valid. In another embodiment, the request to modify further includes adjusting the quantity of tax submissions in which the electronic authorization is valid.

In one embodiment, the system receives an indication that the electronic authorization is valid for a period of time. In one embodiment, the system determines that the electronic authorization is no longer valid. In one embodiment, the system transmits an indication to the player that the electronic authorization is no longer valid. In one embodiment, the system transmits a request for the player to submit an updated electronic authorization.

In one embodiment, the system verifies that the electronic tax form is up-to-date. In one embodiment, the system updates the electronic tax form to reflect any changes within the at least one jurisdiction.

System 100 also may print 426 any relevant vouchers that are earned by the player during the gaming session.

In one embodiment, the player plays the game, when the aggregate amount triggers a taxable event, the machine automatically records the event with the pin. For example, the pin may be used to execute the tax form. The machine then automatically submits the tax form on behalf of the player. The machine also may deduct the corresponding tax liability from the player's winnings. The player does not need to stop playing. Once the player has surpassed a certain number of games or the specific length of time has expired, the system may prompt the player to re-authorize his authorization on the tax forms.

In one embodiment, the system receives a request from a player to play a game on a gaming device. The system determines an identity of the player and a location of the gaming device. The system also determines whether the player has an authorization profile. Based on the location of the gaming device, the system determines at least one jurisdiction that governs the player's taxable winnings Alternative Technologies It will be understood that the technologies described herein for making, using, or practicing various embodiments are but a subset of the possible technologies that may be used for the same or similar purposes. The particular technologies described herein are not to be construed as limiting. Rather, various embodiments contemplate alternate technologies for making, using, or practicing various embodiments.

Modifications, additions, or omissions may be made to the method without departing from the scope of the invention. The method may include more, fewer, or other steps. Additionally, steps may be performed in any suitable order without departing from the scope of the invention.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the claims herein.

Additional Embodiments

A. A method for computing an aggregate tax liability at a gaming device, in which the method comprises: receiving, via a processor, an indication from the gaming device of a start of a gaming period, in which a plurality of games are played by a player during the gaming period, in which the processor and the gaming device are in communication over a network; receiving, via the processor, an indication of an end the gaming period; monitoring, via the processor, an amount of the player's winnings and losses for each game played; computing, via the processor, a total winnings and a total losses incurred by the player during the gaming period; computing, via the processor, an aggregate amount that comprises a summation of the total winning and the total losses during the gaming period; determining, via the processor, a location of the gaming device; based on the location of the gaming device, determining, via the processor, at least one jurisdiction that governs the aggregate tax liability; and computing, via the processor, the aggregate tax liability based on the aggregate amount and the at least one jurisdiction.

A.1. The method of claim A, in which the gaming device is a stationary kiosk. A.2. The method of claim A, in which the gaming device is a mobile device. A.2.1. The method of claim A.2., in which the mobile device is voice-activated by the player. A.2.2. The method of claim A.2., in which the mobile device is hands-free.

A.3. The method of claim A, in which the gaming device is a wearable mobile device. A.3.1. The method of claim A.3., in which the wearable mobile device is an electronic watch. A.3.2. The method of claim A.3., in which the wearable mobile device is a virtual reality (VR) accessory. A.3.3. The method of claim A.3., in which the wearable mobile device is virtual reality goggles. A.3.4. The method of claim A.0., in which the wearable mobile device is a ring.

A.4. The method of claim A, in which detecting the start of the gaming period comprises: receiving an indication that the player has logged onto the gaming device; and in which detecting the end of the gaming period comprises receiving an indication that the player has logged off the gaming device. A.4.1. The method of claim A.4., in which the player logs onto the gaming device by providing biometric information. A.5. The method of claim A, in which detecting the start of the gaming period comprises receiving an indication that the player has inserted a credit card into the gaming device; and in which detecting the end of the gaming period comprises receiving an indication that the player has removed the credit card from the gaming device. A.6. The method of claim A, in which detecting the start of the gaming period comprises receiving an indication that the player has inserted a player card into the gaming device; and in which detecting the end of the gaming period comprises receiving an indication that the player has removed the player card from the gaming device. A.6.1. The method of claim A.6., in which the player card comprises a monetary value. A.7. The method of claim A, in which detecting the start of the gaming period comprises receiving an indication that the player has inserted a player card into the gaming device, in which the player card comprises a monetary value; and in which detecting the end of the gaming period comprises receiving an indication that the monetary value of the player card has been exhausted. A.8. The method of claim A, in which detecting the start of the gaming period comprises receiving an indication that the player has inserted a monetary value in tokens into the gaming device; and in which detecting the end of the gaming period comprises receiving an indication that the monetary value has run out. A.9. The method of claim A further comprising: receiving a request to start the gaming period; and receiving a request to end the gaming period.

A.10. The method of claim A further comprising: determining that the aggregate amount equals a net loss and determining that no tax liability exists. A.11. The method of claim A further comprising: generating a reporting statement that indicates the total winnings and the total losses during the gaming period, in which the reporting statement may be submitted to the IRS. A.11.1. The method of claim A.11., in which the reporting statement is printed by a TITO (ticket-in, ticket-out) machine. A.11.2. The method of claim A.11., in which the player obtains the reporting statement via nearfield technology.

A.12. The method of claim A further comprising: requesting that the player fill out an electronic tax form for each jurisdiction that is relevant to the player; obtaining an electronic authorization from the player; determining that the aggregate tax liability exceeds a taxable threshold for the at least one jurisdiction; and in response to determining that the aggregate tax liability exceeds the taxable threshold, transmitting a tax submission to a tax authority, in which the tax submission comprises at least the electronic tax form and the electronic authorization.

A.12.1. The method of claim A.12 further comprising: receiving an indication that the electronic authorization is valid for a period of time. A.12.2. The method of claim A.12 further comprising: receiving an indication that the electronic authorization is valid for a quantity of games played by the player. A.12.3. The method of claim A.12 further comprising receiving an indication that the electronic authorization is valid for a quantity of tax submissions. A.12.4. The method of claim A.12 further comprising: receiving an indication that the electronic authorization is valid for a maximum tax liability amount, in which the maximum tax liability amount is determined in advance of receiving the request from the player. A.12.5. The method of claim A.12 further comprising: receiving an indication that the electronic authorization is valid for a type of game.

A.12.6. The method of claim A.12, in which obtaining the electronic authorization of the player comprises: receiving an electronic signature. A.12.7. The method of claim A.12, in which obtaining the electronic authorization comprises: receiving biometric data of the player. A.12.8. The method of claim A.12., in which obtaining the electronic authorization of the player comprises: performing a retinal scan on the player. A.12.9. The method of claim A.12., in which obtaining the electronic authorization of the player comprises: performing a facial scan on the player. A.12.10. The method of claim A.12., in which obtaining the electronic authorization of the player comprises: performing a fingerprint scan on the player.

A.12.11. The method of claim A.12., in which the taxable threshold varies depending on the at least one jurisdiction.

A.12.12. The method of claim A.12., in which the taxable threshold is an amount that is determined by the location of the player.

A.12.13. The method of claim A.12, in which transmitting the electronic tax form and transmitting the electronic authorization are performed on behalf of the player. A.12.14. The method of claim A.12, in which a prompt is transmitted to the player, in which the prompt requests the player's approval before transmitting the electronic tax form and transmitting the electronic authorization. A.12.15. The method of claim A.12, in which the electronic tax form and the electronic authorization are transmitted automatically without the player's input. A.12.16. The method of claim A.12 further comprising: transmitting a notification to the player that the tax submission has been transmitted.

A.12.17. The method of claim A.12 further comprising: receiving a request to modify the electronic authorization from the player. A.12.17.1. The method of claim A.12.17, in which the request to modify further comprises: canceling the electronic authorization for the game. A.12.17.2. The method of claim A.12.17, in which the request to modify further comprises: adjusting a period of time in which the electronic authorization is valid. A.12.17.3. The method of claim A.12.17, in which the request to modify further comprises: adjusting a quantity of games in which the electronic authorization is valid. A.12.17.4. The method of claim A.12.17, in which the request to modify further comprises: adjusting a quantity of tax submissions in which the electronic authorization is valid. A.12.17.5. The method of claim A.12.17, in which the request to modify further comprises: adjusting a maximum tax liability amount in which the electronic authorization is valid. A.12.17.6. The method of claim A.12.17., in which the request to modify further comprises: adjusting a type of game that the electronic authorization is valid.

A.12.18. The method of claim A.12. further comprising: determining that the electronic authorization is no longer valid. A.12.18.1. The method of claim A.12.18. further comprising: transmitting an indication to the player that the electronic authorization is no longer valid. A.12.18.2. The method of claim A.12.18. further comprising: receiving an updated electronic authorization from the player. A.12.19. The method of claim A.12 further comprising: transmitting a request for the player to submit an updated electronic authorization. A.12.19.1. The method of claim A.12.19. further comprising: receiving an updated electronic authorization from the player.

A.12.20. The method of claim A further comprising: verifying that the electronic tax form is up-to-date. A.12.21. The method of claim A further comprising: updating the electronic tax form to reflect any changes within the at least one jurisdiction. A.12.22. The method of claim A, in which the tax authority corresponds to the at least one jurisdiction.

A.13. The method of claim A further comprising: awarding the player with a payout that comprises the player's winnings less the aggregate tax liability. A.13.1. The method of claim A.13. further comprising: storing the player's winnings as credits. A.13.1.1. The method of claim A.13.1., in which the credits are redeemable for playing future games. A.13.1.2. The method of claim A.13.1., in which the credits are converted into cash. A.13.2. The method of claim A.13. further comprising: printing a voucher that is redeemable at a cashier location in an amount of the player's winnings.

B. An apparatus comprising: a processor; and a memory, in which the memory stores instructions which, when executed by the processor, direct the processor to: receive an indication from a gaming device of a start of a gaming period, in which a plurality of games are played by a player during the gaming period, in which the processor and the gaming device are in communication over a network; receive an indication of an end the gaming period; monitor an amount of the player's winnings and losses for each game played; compute a total winnings and a total losses incurred by the player during the gaming period; compute an aggregate amount that comprises a summation of the total winning and the total losses during the gaming period; determine a location of the gaming device; based on the location of the gaming device, determine at least one jurisdiction that governs the player's aggregate tax liability; and compute an aggregate tax liability based on the aggregate amount and the at least one jurisdiction.

B.1. The apparatus of claim B, in which the gaming device is a mobile device. B.1.1. The apparatus of claim B.1., in which the mobile device is voice-activated by the player. B.1.2. The apparatus of claim B.1., in which the mobile device is hands-free. B.2. The apparatus of claim B, in which the gaming device is a stationary kiosk. B.3. The apparatus of claim B, in which the gaming device is a wearable mobile device. B.3.1. The apparatus of claim B.3., in which the wearable mobile device is an electronic watch. B.3.2. The apparatus of claim B.3., in which the wearable mobile device is a virtual reality (VR) accessory. B.3.3. The apparatus of claim B.3., in which the wearable mobile device is virtual reality goggles. B.3.4. The apparatus of claim B.0., in which the wearable mobile device is a ring.

B.4. The apparatus of claim B, in which the memory stores instructions which, when executed by the processor, direct the processor to: receive an indication that the player has logged onto the gaming device and receive an indication that the player has logged off the gaming device. B.4.1. The apparatus of claim B.4., in which the player logs onto the gaming device by providing biometric information.

B.5. The apparatus of claim B, in which the memory stores instructions which, when executed by the processor, direct the processor to: receive an indication that the player has inserted a credit card into the gaming device; and receive an indication that the player has removed the credit card from the gaming device.

B.6. The apparatus of claim B, in which the memory stores instructions which, when executed by the processor, direct the processor to: receive an indication that the player has inserted a player card into the gaming device; and receive an indication that the player has removed the player card from the gaming device. B.6.1. The apparatus of claim B.6., in which the player card comprises a monetary value.

B.7. The apparatus of claim B, in which the memory stores instructions which, when executed by the processor, direct the processor to: receive an indication that the player has inserted a player card into the gaming device, in which the player card comprises a monetary value; and receive an indication that the monetary value of the player card has been exhausted. B.8. The apparatus of claim B, in which the memory stores instructions which, when executed by the processor, direct the processor to: receive an indication that the player has inserted a monetary value in tokens into the gaming device; and receive an indication that the monetary value has run out. B.9. The apparatus of claim B, in which the memory stores instructions which, when executed by the processor, direct the processor to: receive a request to start the gaming period; and receive a request to end the gaming period.

B.10. The apparatus of claim B, in which the memory stores instructions which, when executed by the processor, direct the processor to: determine that the aggregate amount equals a net loss and determine that no tax liability exists. B.11. The apparatus of claim B, in which the memory stores instructions which, when executed by the processor, direct the processor to: generate a reporting statement that indicates the total winnings and the total losses during the gaming period, in which the reporting statement may be submitted to the IRS. B.11.1. The apparatus of claim B.11., in which the reporting statement is printed by a TITO (ticket-in, ticket-out) machine. B.11.2. The apparatus of claim B.11., in which the player obtains the reporting statement via nearfield technology.

B.12. The apparatus of claim B, in which the memory stores instructions which, when executed by the processor, direct the processor to: request that the player fill out an electronic tax form for each jurisdiction that is relevant to the player; obtain an electronic authorization from the player; determine that the aggregate tax liability exceeds a taxable threshold for the at least one jurisdiction; and in response to determining that the aggregate tax liability exceeds the taxable threshold, transmit a tax submission to a tax authority, in which the tax submission comprises at least the electronic tax form and the electronic authorization.

B.12.1. The apparatus of claim B.12, in which the memory stores instructions which, when executed by the processor, direct the processor to: receive an indication that the electronic authorization is valid for a period of time. B.12.2. The apparatus of claim B.12, in which the memory stores instructions which, when executed by the processor, direct the processor to: receive an indication that the electronic authorization is valid for a quantity of games played by the player. B.12.3. The apparatus of claim B.12, in which the memory stores instructions which, when executed by the processor, direct the processor to: receive an indication that the electronic authorization is valid for a quantity of tax submissions. B.12.4. The apparatus of claim B.12, in which the memory stores instructions which, when executed by the processor, direct the processor to: receive an indication that the electronic authorization is valid for a maximum tax liability amount, in which the maximum tax liability amount is determined in advance of receiving the request from the player. B.12.5. The apparatus of claim B.12, in which the memory stores instructions which, when executed by the processor, direct the processor to: receive an indication that the electronic authorization is valid for a type of game.

B.12.6. The apparatus of claim B.12, in which the memory stores instructions which, when executed by the processor, direct the processor to: receive an electronic signature. B.12.7. The apparatus of claim B.12, in which the memory stores instructions which, when executed by the processor, direct the processor to: receive biometric data of the player. B.12.8. The apparatus of claim B.12., in which the memory stores instructions which, when executed by the processor, direct the processor to: perform a retinal scan on the player. B.12.9. The apparatus of claim B.12., in which the memory stores instructions which, when executed by the processor, direct the processor to: perform a facial scan on the player. B.12.10. The apparatus of claim B.12., in which the memory stores instructions which, when executed by the processor, direct the processor to: perform a fingerprint scan on the player.

B.12.11. The apparatus of claim B.12., in which the taxable threshold varies depending on the at least one jurisdiction. B.12.12. The apparatus of claim B.12., in which the taxable threshold is an amount that is determined by the location of the player.

B.12.13. The apparatus of claim B.12, in which transmitting the electronic tax form and transmitting the electronic authorization are performed on behalf of the player. B.12.14. The apparatus of claim B.12, in which a prompt is transmitted to the player, in which the prompt requests the player's approval before transmitting the electronic tax form and transmitting the electronic authorization. B.12.15. The apparatus of claim B.12, in which the electronic tax form and the electronic authorization are transmitted automatically without the player's input. B.12.16. The apparatus of claim B.12, in which the memory stores instructions which, when executed by the processor, direct the processor to: transmit a notification to the player that the tax submission has been transmitted.

B.12.17. The apparatus of claim B.12, in which the memory stores instructions which, when executed by the processor, direct the processor to: receive a request to modify the electronic authorization from the player. B.12.17.1. The apparatus of claim B.12.17, in which the memory stores instructions which, when executed by the processor, direct the processor to: cancel the electronic authorization for the game. B.12.17.2. The apparatus of claim B.12.17, in which the memory stores instructions which, when executed by the processor, direct the processor to: adjust a period of time in which the electronic authorization is valid. B.12.17.3. The apparatus of claim B.12.17, in which the memory stores instructions which, when executed by the processor, direct the processor to: adjust a quantity of games in which the electronic authorization is valid. B.12.17.4. The apparatus of claim B.12.17, in which the memory stores instructions which, when executed by the processor, direct the processor to: adjust a quantity of tax submissions in which the electronic authorization is valid. B.12.17.5. The apparatus of claim B.12.17, in which the memory stores instructions which, when executed by the processor, direct the processor to: adjust a maximum tax liability amount in which the electronic authorization is valid. B.12.17.6. The apparatus of claim B.12.17, in which the memory stores instructions which, when executed by the processor, direct the processor to: adjust a type of game that the electronic authorization is valid.

B.12.18. The apparatus of claim B.12., in which the memory stores instructions which, when executed by the processor, direct the processor to: determine that the electronic authorization is no longer valid. B.12.18.1. The apparatus of claim B.12.18, in which the memory stores instructions which, when executed by the processor, direct the processor to: transmit an indication to the player that the electronic authorization is no longer valid. B.12.18.2. The apparatus of claim B.12.18, in which the memory stores instructions which, when executed by the processor, direct the processor to: receive an updated electronic authorization from the player. B.12.19. The apparatus of claim B.12, in which the memory stores instructions which, when executed by the processor, direct the processor to: transmit a request for the player to submit an updated electronic authorization. B.12.19.1. The apparatus of claim B.12.19, in which the memory stores instructions which, when executed by the processor, direct the processor to: receive an updated electronic authorization from the player.

B.12.20. The apparatus of claim B, in which the memory stores instructions which, when executed by the processor, direct the processor to: verify that the electronic tax form is up-to-date. B.12.21. The apparatus of claim B, in which the memory stores instructions which, when executed by the processor, direct the processor to: update the electronic tax form to reflect any changes within the at least one jurisdiction. B.12.22. The apparatus of claim B, in which the tax authority corresponds to the at least one jurisdiction.

B.13. The apparatus of claim B, in which the memory stores instructions which, when executed by the processor, direct the processor to: award the player with a payout that comprises the player's winnings less the aggregate tax liability. B.13.1. The apparatus of claim B.13, in which the memory stores instructions which, when executed by the processor, direct the processor to: store the player's winnings as credits. B.13.1.1. The apparatus of claim B.13.1., in which the credits are redeemable for playing future games. B.13.1.2. The apparatus of claim B.13.1., in which the credits are converted into cash. B.13.2. The apparatus of claim B.13, in which the memory stores instructions which, when executed by the processor, direct the processor to: print a voucher that is redeemable at a cashier location in an amount of the player's winnings.

C. An article of manufacture comprising: a tangible, non-transitory computer-readable medium, in which the computer-readable medium stores instructions which, when executed by a processor, direct the processor to: receive an indication from a gaming device of a start of a gaming period, in which a plurality of games are played by a player during the gaming period, in which the processor and the gaming device are in communication over a network; receive an indication of an end the gaming period; monitor an amount of the player's winnings and losses for each game played; compute a total winnings and a total losses incurred by the player during the gaming period; compute an aggregate amount that comprises a summation of the total winning and the total losses during the gaming period; determine a location of the gaming device; based on the location of the gaming device, determine at least one jurisdiction that governs the player's aggregate tax liability; and compute an aggregate tax liability based on the aggregate amount and the at least one jurisdiction.

C.1. The article of manufacture of claim C, in which the gaming device is a mobile device. C.1.1. The article of manufacture of claim C.1., in which the mobile device is voice-activated by the player. C.1.2. The article of manufacture of claim C.1., in which the mobile device is hands-free. C.2. The article of manufacture of claim C, in which the gaming device is a stationary kiosk. C.3. The article of manufacture of claim C, in which the gaming device is a wearable mobile device. C.3.1. The article of manufacture of claim C.3., in which the wearable mobile device is an electronic watch. C.3.2. The article of manufacture of claim C.3., in which the wearable mobile device is a virtual reality (VR) accessory. C.3.3. The article of manufacture of claim C.3., in which the wearable mobile device is virtual reality goggles. C.3.4. The article of manufacture of claim C.0., in which the wearable mobile device is a ring.

C.4. The article of manufacture of claim C, in which the tangible, non-transitory computer-readable medium stores instructions which, when executed by the processor, direct the processor to: receive an indication that the player has logged onto the gaming device and receive an indication that the player has logged off the gaming device. C.4.1. The article of manufacture of claim C.4., in which the player logs onto the gaming device by providing biometric information.

C.5. The article of manufacture of claim C, in which the tangible, non-transitory computer-readable medium stores instructions which, when executed by the processor, direct the processor to: receive an indication that the player has inserted a credit card into the gaming device; and receive an indication that the player has removed the credit card from the gaming device.

C.6. The article of manufacture of claim C, in which the tangible, non-transitory computer-readable medium stores instructions which, when executed by the processor, direct the processor to: receive an indication that the player has inserted a player card into the gaming device; and receive an indication that the player has removed the player card from the gaming device. C.6.1. The article of manufacture of claim C.6., in which the player card comprises a monetary value.

C.7. The article of manufacture of claim C, in which the tangible, non-transitory computer-readable medium stores instructions which, when executed by the processor, direct the processor to: receive an indication that the player has inserted a player card into the gaming device, in which the player card comprises a monetary value; and receive an indication that the monetary value of the player card has been exhausted. C.8. The article of manufacture of claim C, in which the tangible, non-transitory computer-readable medium stores instructions which, when executed by the processor, direct the processor to: receive an indication that the player has inserted a monetary value in tokens into the gaming device; and receive an indication that the monetary value has run out. C.9. The article of manufacture of claim C, in which the tangible, non-transitory computer-readable medium stores instructions which, when executed by the processor, direct the processor to: receive a request to start the gaming period; and receive a request to end the gaming period.

C.10. The article of manufacture of claim C, in which the tangible, non-transitory computer-readable medium stores instructions which, when executed by the processor, direct the processor to: determine that the aggregate amount equals a net loss and determine that no tax liability exists. C.11. The article of manufacture of claim C, in which the tangible, non-transitory computer-readable medium stores instructions which, when executed by the processor, direct the processor to: generate a reporting statement that indicates the total winnings and the total losses during the gaming period, in which the reporting statement may be submitted to the IRS. C.11.1. The article of manufacture of claim C.11., in which the reporting statement is printed by a TITO (ticket-in, ticket-out) machine. C.11.2. The article of manufacture of claim C.11., in which the player obtains the reporting statement via nearfield technology.

C.12. The article of manufacture of claim C, in which the tangible, non-transitory computer-readable medium stores instructions which, when executed by the processor, direct the processor to: request that the player fill out an electronic tax form for each jurisdiction that is relevant to the player; obtain an electronic authorization from the player; determine that the aggregate tax liability exceeds a taxable threshold for the at least one jurisdiction; and in response to determining that the aggregate tax liability exceeds the taxable threshold, transmit a tax submission to a tax authority, in which the tax submission comprises at least the electronic tax form and the electronic authorization.

C.12.1. The article of manufacture of claim C.12, in which the tangible, non-transitory computer-readable medium stores instructions which, when executed by the processor, direct the processor to: receive an indication that the electronic authorization is valid for a period of time. C.12.2. The article of manufacture of claim C.12, in which the tangible, non-transitory computer-readable medium stores instructions which, when executed by the processor, direct the processor to: receive an indication that the electronic authorization is valid for a quantity of games played by the player. C.12.3. The article of manufacture of claim C.12, in which the tangible, non-transitory computer-readable medium stores instructions which, when executed by the processor, direct the processor to: receive an indication that the electronic authorization is valid for a quantity of tax submissions. C.12.4. The article of manufacture of claim C.12, in which the tangible, non-transitory computer-readable medium stores instructions which, when executed by the processor, direct the processor to: receive an indication that the electronic authorization is valid for a maximum tax liability amount, in which the maximum tax liability amount is determined in advance of receiving the request from the player. C.12.5. The article of manufacture of claim C.12, in which the tangible, non-transitory computer-readable medium stores instructions which, when executed by the processor, direct the processor to: receive an indication that the electronic authorization is valid for a type of game.

C.12.6. The article of manufacture of claim C.12, in which the tangible, non-transitory computer-readable medium stores instructions which, when executed by the processor, direct the processor to: receive an electronic signature. C.12.7. The article of manufacture of claim C.12, in which the tangible, non-transitory computer-readable medium stores instructions which, when executed by the processor, direct the processor to: receive biometric data of the player. C.12.8. The article of manufacture of claim C.12., in which the tangible, non-transitory computer-readable medium stores instructions which, when executed by the processor, direct the processor to: perform a retinal scan on the player. C.12.9. The article of manufacture of claim C.12., in which the tangible, non-transitory computer-readable medium stores instructions which, when executed by the processor, direct the processor to: perform a facial scan on the player. C.12.10. The article of manufacture of claim C.12., in which the tangible, non-transitory computer-readable medium stores instructions which, when executed by the processor, direct the processor to: perform a fingerprint scan on the player.

C.12.11. The article of manufacture of claim C.12., in which the taxable threshold varies depending on the at least one jurisdiction. C.12.12. The article of manufacture of claim C.12., in which the taxable threshold is an amount that is determined by the location of the player.

C.12.13. The article of manufacture of claim C.12, in which transmitting the electronic tax form and transmitting the electronic authorization are performed on behalf of the player. C.12.14. The article of manufacture of claim C.12, in which a prompt is transmitted to the player, in which the prompt requests the player's approval before transmitting the electronic tax form and transmitting the electronic authorization. C.12.15. The article of manufacture of claim C.12, in which the electronic tax form and the electronic authorization are transmitted automatically without the player's input. C.12.16. The article of manufacture of claim C.12, in which the tangible, non-transitory computer-readable medium stores instructions which, when executed by the processor, direct the processor to: transmit a notification to the player that the tax submission has been transmitted.

C.12.17. The article of manufacture of claim C.12, in which the tangible, non-transitory computer-readable medium stores instructions which, when executed by the processor, direct the processor to: receive a request to modify the electronic authorization from the player. C.12.17.1. The article of manufacture of claim C.12.17, in which the tangible, non-transitory computer-readable medium stores instructions which, when executed by the processor, direct the processor to: cancel the electronic authorization for the game. C.12.17.2. The article of manufacture of claim C.12.17, in which the tangible, non-transitory computer-readable medium stores instructions which, when executed by the processor, direct the processor to: adjust a period of time in which the electronic authorization is valid. C.12.17.3. The article of manufacture of claim C.12.17, in which the tangible, non-transitory computer-readable medium stores instructions which, when executed by the processor, direct the processor to: adjust a quantity of games in which the electronic authorization is valid. C.12.17.4. The article of manufacture of claim C.12.17, in which the tangible, non-transitory computer-readable medium stores instructions which, when executed by the processor, direct the processor to: adjust a quantity of tax submissions in which the electronic authorization is valid. C.12.17.5. The article of manufacture of claim C.12.17, in which the tangible, non-transitory computer-readable medium stores instructions which, when executed by the processor, direct the processor to: adjust a maximum tax liability amount in which the electronic authorization is valid. C.12.17.6. The article of manufacture of claim C.12.17, in which the tangible, non-transitory computer-readable medium stores instructions which, when executed by the processor, direct the processor to: adjust a type of game that the electronic authorization is valid.

C.12.18. The article of manufacture of claim C.12., in which the tangible, non-transitory computer-readable medium stores instructions which, when executed by the processor, direct the processor to: determine that the electronic authorization is no longer valid. C.12.18.1. The article of manufacture of claim C.12.18, in which the tangible, non-transitory computer-readable medium stores instructions which, when executed by the processor, direct the processor to: transmit an indication to the player that the electronic authorization is no longer valid. C.12.18.2. The article of manufacture of claim C.12.18, in which the tangible, non-transitory computer-readable medium stores instructions which, when executed by the processor, direct the processor to: receive an updated electronic authorization from the player. C.12.19. The article of manufacture of claim C.12, in which the tangible, non-transitory computer-readable medium stores instructions which, when executed by the processor, direct the processor to: transmit a request for the player to submit an updated electronic authorization. C.12.19.1. The article of manufacture of claim C.12.19, in which the tangible, non-transitory computer-readable medium stores instructions which, when executed by the processor, direct the processor to: receive an updated electronic authorization from the player.

C.12.20. The article of manufacture of claim C, in which the tangible, non-transitory computer-readable medium stores instructions which, when executed by the processor, direct the processor to: verify that the electronic tax form is up-to-date. C.12.21. The article of manufacture of claim C, in which the tangible, non-transitory computer-readable medium stores instructions which, when executed by the processor, direct the processor to: update the electronic tax form to reflect any changes within the at least one jurisdiction. C.12.22. The article of manufacture of claim C, in which the tax authority corresponds to the at least one jurisdiction.

C.13. The article of manufacture of claim C, in which the tangible, non-transitory computer-readable medium stores instructions which, when executed by the processor, direct the processor to: award the player with a payout that comprises the player's winnings less the aggregate tax liability. C.13.1. The article of manufacture of claim C.13, in which the tangible, non-transitory computer-readable medium stores instructions which, when executed by the processor, direct the processor to: store the player's winnings as credits. C.13.1.1. The article of manufacture of claim C.13.1., in which the credits are redeemable for playing future games. C.13.1.2. The article of manufacture of claim C.13.1., in which the credits are converted into cash. C.13.2. The article of manufacture of claim C.13, in which the tangible, non-transitory computer-readable medium stores instructions which, when executed by the processor, direct the processor to: print a voucher that is redeemable at a cashier location in an amount of the player's winnings.

INCORPORATION BY REFERENCE

The following issued patents and patent applications are incorporated in their entirety by reference herein for all purposes:
U.S. application Ser. No. 14/584,381;
U.S. Prov. No. 61/921,409;
U.S. Pat. No. 8,210,931 (application Ser. No. 11/871,403);
U.S. Pat. No. 6,579,181;
U.S. Pat. No. 6,299,536;
U.S. Pat. No. 6,093,103;
U.S. Pat. No. 5,941,769;
U.S. Pat. No. 7,114,718;
U.S. Patent Publication 20050012269;
U.S. Pat. No. 4,515,367;
U.S. Pat. No. 5,000,453;
U.S. Pat. No. 7,137,630;
U.S. Pat. No. 7,137,629;
U.S. application Ser. No. 14/584,381.

What is claimed is:
1. A method comprising:
receiving, via a processor, an indication from a gaming device of a start of a gaming period;
detecting cessation of a gaming activity during the gaming period;
detecting resumption of the gaming activity during the gaming period;
using a same session for the gaming activity after the resumption that was used prior to the cessation during the gaming period;
receiving, via the processor, an indication of an end of the gaming period;
monitoring, via the processor, an amount of winnings and losses for each game played during the gaming period;
computing, via the processor, an aggregate amount that comprises a summation of the winnings and losses during the gaming period;
determining, via the processor, a location of the gaming device;
based on the location of the gaming device, determining, via the processor, at least one tax jurisdiction;
computing, via the processor, an aggregate tax liability based on the summation and the at least one tax jurisdiction;
determining, via the processor, whether the aggregate tax liability exceeds a tax threshold for the at least one tax jurisdiction; and
when the aggregate tax liability exceeds the tax threshold, generating, via the processor, an electronically generated tax document that is electronically authorized by a player for transmission to a computing device of a tax authority and deducting the aggregate tax liability from the aggregate amount.

2. The method of claim 1, in which the gaming device is a stationary kiosk.

3. The method of claim 2, in which the gaming device is voice-activated by the player.

4. The method of claim 1, in which the gaming device is a mobile device.

5. The method of claim 1, in which the gaming device is a wearable mobile device.

6. The method of claim 1, in which detecting the start of the gaming period comprises receiving an indication that the player has logged onto the gaming device; and in which detecting the cessation comprises receiving an indication that the player has logged off the gaming device.

7. The method of claim 6, in which the player logs onto the gaming device by providing biometric information.

8. The method of claim 1, in which detecting the start of the gaming period comprises receiving an indication that the player has inserted a credit card into the gaming device; and in which detecting the end of the gaming period comprises receiving an indication that the player has removed the credit card from the gaming device.

9. The method of claim 1 further comprising:
generating a reporting statement that indicates total winnings and total losses during the gaming period.

10. The method of claim 1 further comprising:
requesting that the player fill out an electronic tax form for each jurisdiction that is relevant to the player;
obtaining an electronic authorization from the player;
determining that the aggregate tax liability exceeds a taxable threshold for the at least one tax jurisdiction; and
in response to determining that the aggregate tax liability exceeds the taxable threshold, transmitting a tax submission to the tax authority, in which the tax submission comprises at least the electronic tax form and the electronic authorization.

11. The method of claim 10 further comprising: receiving an indication that the electronic authorization is valid for a period of time.

12. The method of claim 10, in which obtaining the electronic authorization of the player comprises:
receiving an electronic signature.

13. The method of claim 10, in which obtaining the electronic authorization comprises: receiving biometric data of the player.

14. The method of claim 10, in which transmitting the electronic tax form and transmitting the electronic authorization are performed on behalf of the player.

15. An apparatus comprising:
a processor; and
a memory, in which the memory to store instructions which, when executed by the processor, direct the processor to:
receive an indication from a gaming device of a start of a gaming period;
detecting cessation of a gaming activity during the gaming period;
detecting resumption of the gaming activity during the gaming period;
using a same session for the gaming activity after the resumption that was used prior to the cessation during the gaming period;
receive an indication of an end of the gaming period;
monitor an amount of winnings and losses for each game played during the gaming period;
compute an aggregate amount that comprises a summation of the winnings and losses during the gaming period;
determine a location of the gaming device;
based on the location of the gaming device, determine at least one tax jurisdiction;
compute an aggregate tax liability based on the summation and the at least one tax jurisdiction;
determine whether the aggregate tax liability exceeds a tax threshold for the at least one tax jurisdiction; and
when the aggregate tax liability exceeds the tax threshold, generate an electronically generated tax document that is electronically authorized by a player for transmission to a computing device of a tax authority and deduct the aggregate tax liability from the aggregate amount.

16. The apparatus of claim 15, in which to detect the start of the gaming period comprises to receive an indication that the player has logged onto the gaming device; and in which to detect cessation comprises to receive an indication that the player has logged off the gaming device.

17. The apparatus of claim 15, in which to detect the start of the gaming period comprises to receive an indication that the player has inserted a credit card into the gaming device; and in which to detect cessation comprises to receive an indication that the player has removed the credit card from the gaming device.

18. The apparatus of claim 15 further comprising to:
generate a reporting statement that indicates total winnings and total losses during the gaming period.

19. The apparatus of claim 15 further comprising to request that the player fill out an electronic tax form for each jurisdiction that is relevant to the player.

* * * * *